(12) United States Patent
Mendes

(10) Patent No.: US 8,430,946 B2
(45) Date of Patent: Apr. 30, 2013

(54) PROCESS FOR RECOVERY OF NICKEL AND COBALT FROM LATERITE ORES USING ION EXCHANGE RESIN

(76) Inventor: Flavia Dutra Mendes, Minas Gerais (BR)

(*) Notice: Subject to any disclaimer, the term of this patent is extended or adjusted under 35 U.S.C. 154(b) by 548 days.

(21) Appl. No.: 12/514,305

(22) PCT Filed: Nov. 12, 2007

(86) PCT No.: PCT/BR2007/000314
§ 371 (c)(1),
(2), (4) Date: Sep. 29, 2009

(87) PCT Pub. No.: WO2008/055335
PCT Pub. Date: May 15, 2008

(65) Prior Publication Data
US 2010/0196190 A1   Aug. 5, 2010

(30) Foreign Application Priority Data
Nov. 10, 2006 (BR) .................................... 0612374

(51) Int. Cl.
*C22B 3/04* (2006.01)
*C22B 3/42* (2006.01)
*C22B 23/00* (2006.01)

(52) U.S. Cl.
USPC .............. 75/743; 205/370; 204/529; 204/533

(58) Field of Classification Search .................... 75/743; 205/370; 204/529, 533
See application file for complete search history.

(56) References Cited

U.S. PATENT DOCUMENTS

| 7,758,669 B2 * | 7/2010 | Miller et al. ................ 75/743 |
| 2001/0001650 A1 * | 5/2001 | Duyvesteyn et al. ......... 423/139 |

FOREIGN PATENT DOCUMENTS

| CA | 2538962 A1 | 9/2007 |
| RU | 2156315 C1 | 9/2000 |
| WO | WO 02/08477 A1 | 1/2002 |

* cited by examiner

*Primary Examiner* — George Wyszomierski
*Assistant Examiner* — Tima M McGuthry Banks
(74) *Attorney, Agent, or Firm* — Arent Fox LLP

(57) ABSTRACT

The process, according to the invention, comprises the following stages: (a) processing (1) of the laterite ore (O) by crushing, scrubbing, attrition, separation, and high-intensity magnetic separation; (b) Leaching (2) of the non-magnetic fraction (CN) obtained form the previous stage (a); (c) optionally, neutralization (3) of the effluent from the leaching and/or solid-liquid separation stages (4); (d) treatment of the effluents from stages (b) or (c) using an ion-exchange hybrid system (5) comprising at least one circuit for removal of impurities and at least one circuit for recovery of nickel and cobalt; (e) elution (6) of the ion-exchange resin used; (f) separation, purification, and recovery (7) of the nickel and cobalt.

25 Claims, 7 Drawing Sheets

PROCESS FOR RECOVERY OF NICKEL AND COBALT FROM LATERITE ORES USING ION EXCHANGE RESIN

FIELD OF THE INVENTION

The present invention comprises an ion exchange process for recovery of nickel and cobalt present in leach effluents, in the form of pulp or solution, resulting from the various forms of leaching of nickel ores in general. More specifically, the ion exchange process for recovery of nickel and cobalt present in leach effluents is an alternative for the purification of pulps and solutions in hydrometallurgical processes for the processing of nickel ores.

BACKGROUND OF THE INVENTION

As it is known by the person skilled in the art, various hydrometallurgical routes have been developed for extraction of nickel and cobalt contained in laterite ores. The objective of said routes is to solubilize the metallic species by using inorganic acids for heap leaching either in tanks under conditions of atmospheric pressure and at temperatures below the boiling point or in pressurized vessels, followed by neutralization (removal of Cu, Fe, Cr, and Al), and an optional solid-liquid separation prior to purification of the solution and final recovery of nickel and cobalt in the metallic form or as an intermediate product. The conventional hydrometallurgical route is shown in FIG. 10.

Selective recovery of the metal present in the leach effluent is an important stage in drawing up the economic evaluation. In the specific case of nickel and cobalt, they have very similar chemical properties, which facilitates operations for the simultaneous recovery of said metals by precipitation of either mixed sulfides (MSP) or mixed hydroxides (MHP), or by solvent extraction in hydrochloric, ammoniacal, or sulfuric medium, or by ion-exchange extraction using polymeric ion-exchange resins.

The ion-exchange technique using polymeric resins for selective nickel adsorption may be applied in two different ways: resin-in-solution and resin-in-pulp.

In the resin-in-solution option of operation, a solution with dissolved metals is brought in contact with the resin, and generally, adsorption is carried out on a fixed bed, such as for example, in adsorption columns.

In the resin-in-pulp option of operation, the ore pulp or any other pulp is brought in direct contact with the resin by means of an agitation system, so that adsorption of the metal occurs without the need for prior solid-liquid separation of the pulp. The resin is then separated from the pulp by screening.

Either of the two options can be adopted in flow sheets of nickel laterite ore processing. For resin-in-solution operation, solid-liquid separation is required, except in heap leaching cases where the resulting product is already in the form of solution. In this solid-liquid separation stage, besides its significant operational cost, there is some loss of nickel due to the inefficiency of the process, owing to the difficulty of washing the solids and recovering the dissolved species. In comparison, the resin-in-pulp process involves direct recovery of the dissolved metal from the leach pulp by means of an ion exchanger, thus eliminating the need for solid-liquid separation.

Although the application of resin-in-pulp has some advantages when compared with resin-in-solution, there are some limitations and technical risks in said application, such as the absence in the market of many resins having sufficiently high mechanical strength and abrasion resistance to withstand contact with the pulp. For this reason, the application of resin-in-solution is still often considered to be the best option.

Prior to application of either resin-in-solution or resin-in-pulp, there may be the need for acidity neutralization, pH elevation, and elimination of impurities through precipitation, as shown in FIG. 10, which illustrates the conventional process.

Current resins for selective recovery of nickel, that are commercially available at prices considered attractive, have two marked limitations:

1 Because of the high selectivity for H+ ions, the pH of the solution must be increased to values greater than pH=3, so that most of the resins become selective for nickel and present high adsorption performance for this metal. Otherwise, the excess H+ ions (low pH) will be preferably adsorbed to the detriment of the nickel adsorption process.

2 Every effluent solution from the acid leaching of nickel ores contains various dissolved metals regarded as impurities. Since every resin selective for nickel is also selective for iron, copper, and aluminum, even for lower concentrations of these elements (iron, copper and aluminum) in the solution, it is necessary to treat the solution beforehand, for elimination of these impurities.

The problems aforementioned are currently solved by the adoption of a neutralization stage in which lime, limestone, soda, or ammonium is added. Although this procedure overcomes restraints, it also has its drawbacks, such as significant losses of nickel, which is co-precipitated together with impurities, and, in the case of resin-in-column operation, the need for the onerous solid-liquid separation stage following neutralization.

As a solution for the abovementioned obstacles, mainly the neutralization stage, prior removal of impurities, pH elevation, and consequent losses of co-precipitated nickel, it is suggested herein that resins operating within low pH ranges may be used for example, those containing the functional group 2-picolylamine and concurrently utilizing the hybrid process technology, which eliminates the need for removal of impurities prior to the resin stage, as described in document BR 0600901-8. Thus, the effluent obtained from the leaching stage in the form of either pulp or solution is conveyed directly to the ion-exchange resin stage. The resin hybrid process, as described in the document BR 0600901-8, is necessarily and directly applicable to leach effluents in the form of solution (heap leaching) and in the form of pulp (tank leaching). This process comprises the following stages: processing (1) of the laterite ore (O), followed by either atmospheric or pressure leaching (2) and including the option of treatment of solution from solid-liquid separation in existing plants (2), with the process being characterized by the fact that it includes a circuit comprised of cationic or chelant resins, in which the first stage (3), with ion-exchange resins (Re), presents specific selectivity conditions for the removal of iron, copper, and aluminum and pH elevation, and the second stage (4), with ion-exchange resins (Re) allows recovery of the nickel and cobalt.

A number of documents address the various forms of use of resin applied to effluents from the leaching of nickel ores. Some documents deal with the use of resin applied to the effluent solution, while others deal with the use of resin applied to the effluent pulp. All methods mentioned in the state of the art section require, in some way or other, the adjustment of the pH either before or during contact with the ion-exchange resin.

A process for direct recovery of nickel and cobalt from certain ores is described in document U.S. Pat. No. 6,350,420. In one of the embodiments of the American invention, the nickel ore is leached with mineral acid so as to solubilize the metals, and consequently, form a pulp composed of a solution rich in these metals and leach residues. The leach effluents come in contact with an ion-exchange resin that selectively recovers the nickel and cobalt from the pulp. Preferably, the ion-exchange resin is added to the neutralized pulp. During the contact of the resin with the pulp, the pH is adjusted with the addition of a neutralizing agent. This is the greatest advantage of said American process, as pH control is performed in situ during ion-exchange extraction.

The use of resins applied to a leach solution after the leach effluent neutralization and solid-liquid separation stages is mentioned in documents AU 699127 and U.S. Pat. No. 5,571,308.

The new technological developments are aimed at creating increasingly less costly and more efficient processes. The known technologies, however, are often restricted to certain unit operations, and do not address some basic operational needs of other ore types with typical characteristics. With the new developments, some adaptations need be made in the existing prior flow sheets so as to make for technical improvements aimed at greater cost-effectiveness of the process. Additionally, the process itself may be improved and adapted to the new trends for higher efficiencies.

One other drawback of the conventional ion-exchange processes for recovery of nickel and cobalt from leach effluents is the fact that the neutralization stage is always necessary. Moreover, the solid-liquid separation stage is optional, and where it is not applicable the process is known as resin-in-pulp.

One other drawback of the conventional ion-exchange processes for recovery of nickel and cobalt from leach effluents is the fact that the flowsheets that had been developed often do not offer solutions for the technological challenges. Most times, the efficiency of unit operations is impaired, much as a result of a lack of optimization and development of new techniques for improvement of the existing ones.

OBJECT OF THE INVENTION

The objectives of the present invention, as well as its advantages, are as follows:
- to introduce an ore processing stage before the leaching stage, to eliminate low performance ore fractions;
- to develop a process that allows the use of liquid effluent in resin-in-pulp form, to be subjected to heap leaching effluent which after being neutralized forms a pulp;
- optionally, to carry out neutralization in a step-by-step manner followed by solid-liquid separation, with the solid phase being recirculated to the system, thereby preventing the nickel losses that usually occur in the neutralization stage;
- to adopt the ion-exchange hybrid process so as to make possible the elimination of the neutralization stage;
- to increase the efficiency of the process;
- to generate higher-purity end products;
- to develop a high-performance process for adsorption of nickel under acidic conditions (low pH) and with high concentration of impurities such as copper, aluminum, and iron;
- to decrease the capital cost of the process.

SUMMARY OF THE INVENTION

With the objective of solving the technological problems described hereinabove and thus improve the performance, a process using ion-exchange resin for recovery of nickel and cobalt from laterite ores was developed, said process being comprised of the following stages:

(a) processing (1) of the laterite ore (O) by crushing, scrubbing, attrition, classification, and high-intensity magnetic separation;

(b) leaching (2) of the non-magnetic fraction (CN) obtained from the previous stage (a);

(c) optionally, neutralization (3) of the effluent from the leaching and/or solid-liquid separation stages (4);

(d) treatment of the effluents from stages (b) or (c) using an ion-exchange hybrid system (5) comprising at least one circuit for removal of impurities and at least one circuit for recovery of nickel and cobalt;

(e) elution (6) of the ion-exchange resin used;

(f) separation, purification, and recovery (7) of the nickel and cobalt.

DETAILED DESCRIPTION OF THE INVENTION

Figure 1:
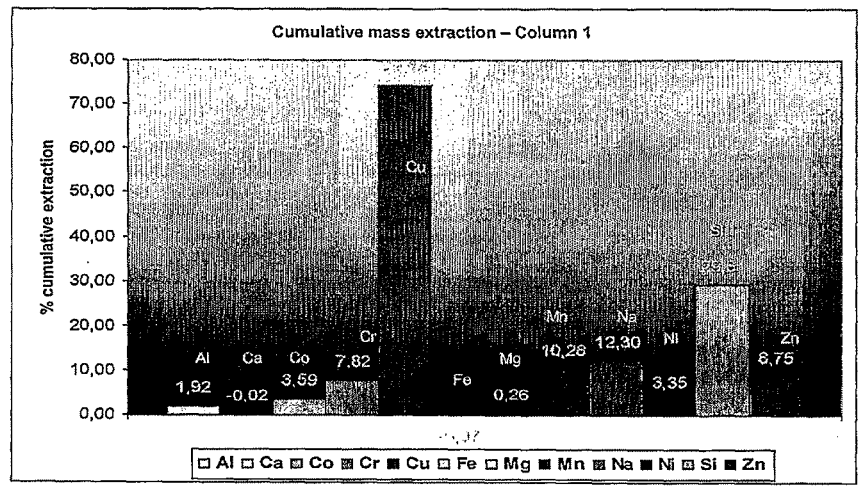
FIG. 1 is a figure illustrating the cumulative extraction of metals including copper removal during a first stage of the hybrid resin-in-solution process, according to various aspects of the current invention.

The present invention, differently from the state-of-the-art processes, proposes an ion-exchange process for recovery of nickel and cobalt from leach laterite ore effluents, indicating various technological options including both resin-in-pulp and resin-in-solution modes, associated with neutralization and solid-liquid separation stages if applicable. Otherwise the neutralization stage may be substituted by the resin hybrid process as described in document BR 0600901-8, with the same effects of pH elevation, and elimination of the contaminants Fe, Al, and Cu.

The process, according to the invention, not necessarily keeps the neutralization (pre-treatment) stage for the solution containing nickel and cobalt, but uses the ion-exchange technology as an economically feasible technical option for the purification of leach effluents. Such challenges can be overcome by ion exchange process, more preferably the process as described in document BR 0600901-8, which uses the hybrid ion-exchange resin process and ensures the removal of any impurity without the need for a preceding neutralization stage.

It should be noted that in the absence of a resin capable of operating in pulp, the resin shall be used in solution, after liquid-solid separation, in which case it is essential to recycle and recover part of the residue containing the co-precipitated nickel losses. In case of heap leach liquid effluent, after being neutralized, this same solution can be considered a pulp (even in the absence of ore), and the resin-in-pulp process option can be used. In this way, it is possible to eliminate the onerous solid-liquid separation stage after neutralization.

Processing (1): In this stage, the objective is to separate and concentrate the ore fraction that is more responsive to the process being proposed herein. For ores of the silicous type, a scrubbing operation followed by classification may be used, so that the coarse fraction with high silica content and marginal nickel contents can be discharged. Only the fine-grained fraction with high nickel contents proceeds along the process. One other option is the use of a high-intensity magnetic separation stage. Prior to being fed to the leaching stage, the ore is properly prepared. This stage is of fundamental importance in the flow sheet of nickel ore processing.

It happens that, when atmospheric leaching is used either in tanks or stacks, nickel ores of the ferruginous type (nickel associated with goethite in the crystalline structure) do not respond well to the process, and therefore it is conventional practice to eliminate this portion of the ore and not take it into account in the portion that feeds the leaching stage, thereby reducing the amount of ore to be treated, and consequently, the size of the leaching vessels and tanks, as well as the residence time of the ore within this equipment.

The magnetic fraction (CM), consisting of goethite, is separated from the process because of its low efficiency in atmospheric leaching, and mainly in heap leaching. In the case of pressure leaching, the magnetic separation stage shall not be considered, since there are no restraints regarding the ore type.

The inclusion of the magnetic separation stage prior to the leaching process eliminates from the process the low-performance ore types (magnetic or CM). Only the non-magnetic fraction (CN) remains in the circuit.

This stage makes for a reduction in the mass to be treated. Only the non-magnetic fraction (CN) proceeds along the circuit, without the presence of goethite, being susceptible to high recoveries, besides leading to reduction in equipment size and residence time.

Leaching (2): Leaching, according to the present invention, may be of acidic (sulfuric, hydrochloric, or nitric) or basic nature. It may occur in the form of heap leaching (2) or in tanks, under atmospheric or pressure conditions, or combinations of these.

In the case of effluents in the form of pulp, these may be conveyed directly to the resin-in-pulp hybrid process (5b) for nickel recovery. In this case there is no need for prior neutralization.

Effluents in the form of solution may be conveyed directly to the resin-in-solution process for nickel recovery using the hybrid resin process (5a). In this case there is no need for prior neutralization.

In the cases of heap leaching and tank leaching involving neutralization and solid-liquid separation, part of the precipitated solids shall be recycled, re-solubilized, and returned to the process. The liquid phase feeds the ion-exchange resin stage through the hybrid resin circuit (5a).

In the case of heap leaching that only generates a liquid effluent without the presence of solids, said liquid effluent may be neutralized, with consequent formation of a pulp (that does not contain ore), which is brought in contact with a resin in the resin-in-pulp process (5b).

In the case in which the pulp from atmospheric or pressure leaching shall necessarily be neutralized to reduce the overload of impurities in the resin, and the solid-liquid separation stage is rendered unnecessary, the resin-in-pulp hybrid process is adopted (5b).

Pre-treatment or neutralization (3): This stage is aimed at eliminating the impurities from the solution so as to reduce the overload in the resin, and as aforementioned, is optional. It is also essential for increasing the pH of the effluent, thus enhancing the performance of the resin regarding nickel and cobalt loading. Said stage may be carried out in steps at different values of the pH. In the first step, at lower pH values, the precipitated solid containing impurities does not contain co-precipitated nickel, and therefore may be discharged. In the second step, at higher pH values, in the event of nickel co-precipitation the residue from solid-liquid separation shall be resolubilized and returned to the process. A first step without losses of nickel in the precipitate (pH<3) generates a residue that is discharged, whereas the second step generates losses of nickel in the precipitate (pH>3), and thus its solid phase is returned to a tank for re-solubilization. Once resolubilized, it is fed again to the neutralization stage.

This procedure avoids the nickel losses that occur in the neutralization stage. The neutralization stage is followed by solid-liquid separation, if applicable, and the next stage comprising resin in column (5a).

The product from neutralization can be conveyed directly to the resin-in-pulp stage (5b), without the need for solid-liquid separation. It should be noted, in this case, that the heap leach effluent in the form of solution, when neutralized, generates a product in the form of pulp, which may contact the resin. In this case, the resin-in-pulp process occurs with a pulp that does not contain ore. When working with pulp, solid-liquid separation is unnecessary.

The pulps from atmospheric or autoclaved leaching, when necessarily subjected to the neutralization stage either followed, or not, by solid-liquid separation, shall feed the ion-exchange resin hybrid circuit. This type of operation with ion-exchange resins favors a higher purification of the solution by eliminating a large portion of the impurities in an initial circuit, and preparing the solution for an efficient adsorption of nickel.

If solid-liquid separation is carried out, then the resin hybrid process is applied to the solution, and part of the residue is re-solubilized and returned to the process, feeding the neutralization stage.

Where solid-liquid separation is not carried out, then the resin hybrid process is applied to the pulp. In this stage, the nickel co-precipitated in the neutralization is returned to the process through the leaching-sorption phenomenon, thus minimizing losses of the metal.

Solid-liquid separation (4): In cases where the resin-in-pulp process is not desired, or cannot be applied, the neutralized effluent shall be subjected to solid-liquid separation. In this case, the obtained solution is brought in contact with the resin, preferably by the hybrid process comprising ion-exchange resins in column (5a), which is aimed at enhanced purification and preparation of the solution for the selective adsorption of nickel. Part of the precipitated solids may be returned to the process, being re-solubilized and fed to the neutralization stage.

Hybrid system using ion-exchange resins (5): The hybrid system process may be applied to the effluent containing nickel and cobalt, obtained in the leaching stage, using resin (5) either in pulp or in solution, depending on the objectives and the type of ore to be treated. The hybrid process shall comprise at least two separate circuits for removal of different metals; for example, one circuit for removal of copper and other impurities, and the other, for the selective adsorption of nickel. This process eliminates the need for prior neutralization of the effluent for elimination of impurities and pH increase. In the case of nickel removal circuit, it is of fundamental importance to choose a resin with special characteristics, such as high performance under acidic conditions (low pH) and as low selectivity for such impurities as Cu, Al, and Fe as possible. This process, however, may be used in conjunction with the neutralization stage, so as to achieve higher purification and scrubbing of the solution prior to selective adsorption of nickel. Either resin in column (5a) or resin in pulp (5b) can be used, according to the feed type to this stage.

Elution (6): Elution may be carried out using different agents, such as sulfuric acid, hydrochloric acid and ammonium hydroxide, ammonium sulfate, or their mixtures.

Separation, purification, and recovery methods (7): The product may be obtained by precipitation, reduction with hydrogen, electrowinning for production of nickel and cobalt in the metallic form, or as an intermediate product in the form of oxides, hydroxides, and carbonates, among others. Additionally, solvent extraction may also be used, among other possible methods.

Although a preferred operational process is described and illustrated herein, it should be noted that modifications are possible and achievable without departing the scope of the present invention The following is an illustrative example of the scope of the present invention.

EXAMPLES

Figure 11:
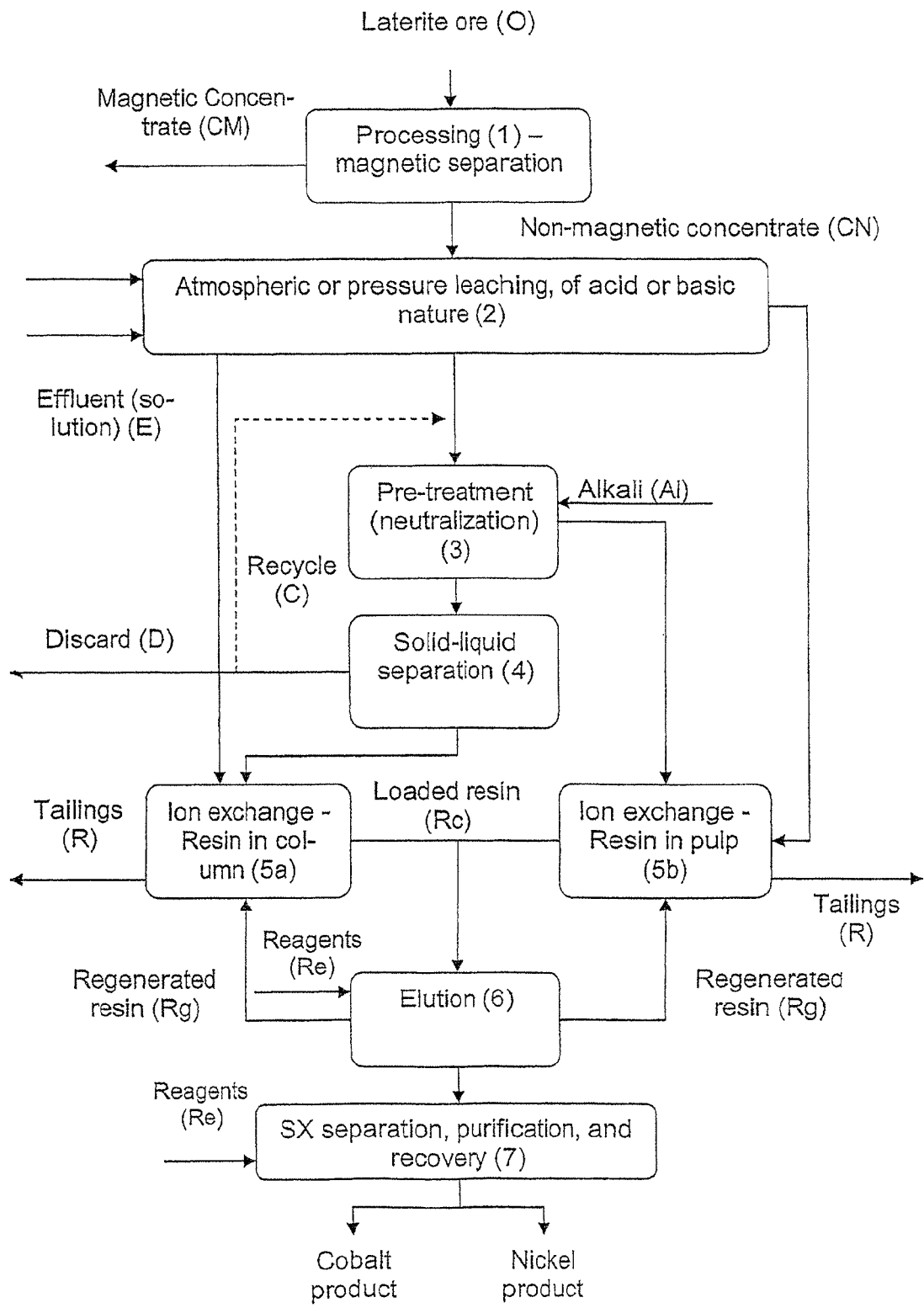
FIG. 11 is a diagram illustrating a method of extracting nickel and cobalt according to various aspects of the current invention.

FIG. 11 enclosed hereto represents the process proposed herein: it starts with a processing stage comprising crushing, scrubbing, attrition, classification, and magnetic separation (1), still in the processing phase of the laterite ore (O), which precedes the leaching stage. Thus, two fractions are generated: a non-magnetic fraction (CN) and a magnetic fraction (CM). The latter contains nickel associated with goethite, presenting an undesirable performance regarding the chosen process, and therefore it should be removed from the flow sheet. Only the non-magnetic fraction (CN) shall proceed along the process, as it is characterized by high performance and high quality results.

Leaching (2) follows the magnetic separation stage (1). The ore leaching stage (2) that is proposed herein may be carried out with leaching agents in the acid or basic form, in some stages, in tanks under atmospheric conditions or in pressurized vessels, or in a combination of any of these types.

Once the metal has been extracted from the ore and solubilized in aqueous solution, the result product is the effluent (E) in the form of either pulp or solution.

Case 1: Next, the ion-exchange resin technique (5), preferably with resins of the chelating type, may be applied directly to the effluent (E) for nickel and cobalt recovery. The ion-exchange technique may be used either with resins in column (5a) or with resins in pulp (5b). It should be noted that the effluent (E) from atmospheric heap leaching may be conveyed directly to the resin-in-solution stage (5a) without necessarily undergoing prior neutralization (3) or even solid-liquid separation (4), as the hybrid resin-in-solution process as described in document BR 0600901-8 can be implemented, which eliminates these stages. In this case, it is of fundamental importance to choose a resin with special characteristics, such as high performance under acidic conditions (low pH) and low selectivity for such impurities as Cu, Al, and Fe.

The following is an example of direct application of a leach effluent in the ion-exchange hybrid process. The first stage, comprising two steps, aims at the removal of impurities, mainly copper, as shown in the tables below. The second stage, which may comprise many steps, is used for the selective removal of nickel.

The chemical composition of the effluent is given in TABLE 1 below:

TABLE 1

| Initial solution (mg/L) | | | | | | | | | | | |
|---|---|---|---|---|---|---|---|---|---|---|---|
| Al | Ca | Co | Cr | CU | Fe | Mg | Mn | Na | Ni | Si | Zn |
| 3508.75 | 541.08 | 109.20 | 141.54 | 259.81 | 11384.19 | 10752.65 | 366.92 | 186.45 | 4048.90 | 171.62 | 38.94 |

Figure 2:
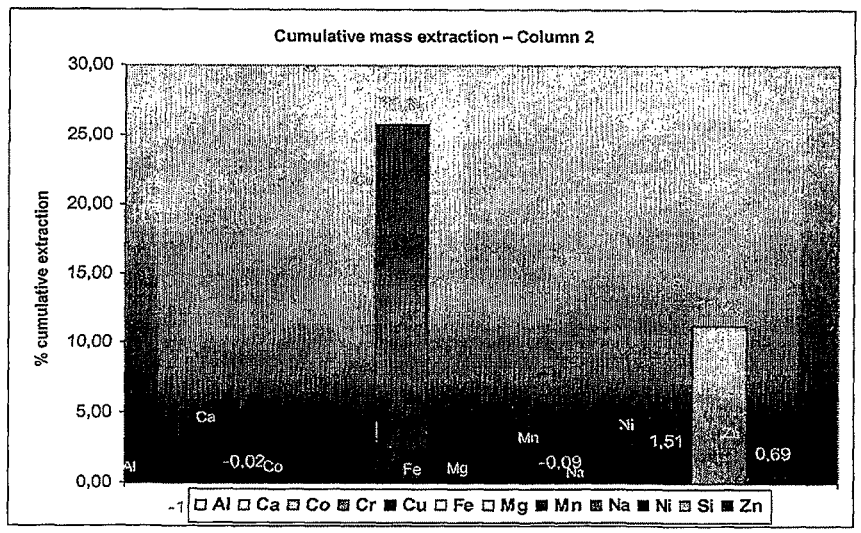
FIG. 2 is a figure illustrating the cumulative extraction of metals including copper removal during a first stage of the hybrid resin-in-solution process, according to various aspects of the current invention.

First stage of the hybrid resin-in-solution process, comprising two steps for copper removal. FIG. 1 shows the cumulative mass extraction in Column 1, and FIG. 2 shows the mass extraction in Column 2.

Figure 3:
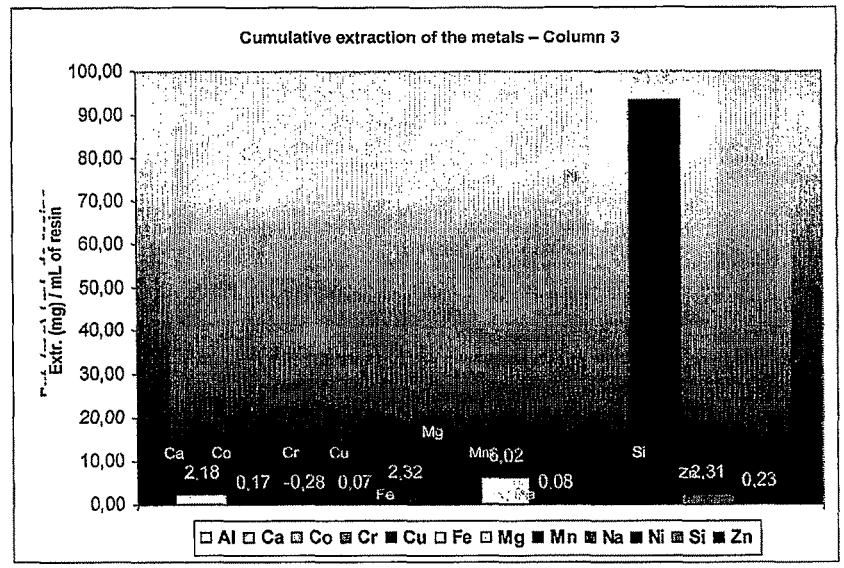
FIG. 3 is a figure illustrating the cumulative extraction of metals including nickel removal during a second stage of the hybrid resin-in-solution process, according to various aspects of the current invention.

The second stage of the hybrid resin-in-solution process for removal of nickel, which may comprise various steps for selective purification, is represented in FIG. 3.

Case 2: In cases where the resin-in-pulp process is not applicable, the leach effluent (E) in the form of either pulp or solution, from any type of leaching, may undergo a pre-treatment, such as neutralization (3), followed by solid-liquid separation (4). Where these stages are needed for further purification of the solution as well as for preparing said solution for nickel adsorption, the hybrid process with the resin in contact with the liquid phase, as described in the document BR 0600901-8, is used. In this case, part of the solid phase (C) from the solid-liquid separation stage (4) may be re-solubilized and returned to the neutralization stage (3) of the process, for recovery of precipitated nickel.

The following is an example of a leach effluent that has been neutralized, filtered, and directed to the hybrid ion-exchange process. A first stage comprises two steps for the removal of copper and impurities. A second stage comprises one or more steps for the removal of nickel.

The chemical composition of the leach effluent is given in TABLE 2 below:

TABLE 2

| | | | | | Initial solution (mg/L) | | | | | | |
|---|---|---|---|---|---|---|---|---|---|---|---|
| Al | Ca | Co | Cr | CU | Fe | Mg | Mn | Na | Ni | Si | Zn |
| 3235.78 | 336.18 | 71.56 | 117.24 | 163.51 | 12671.83 | 9628.45 | 248.24 | 108.76 | 2468.80 | 135.00 | 38.00 |

The chemical composition of the effluent that has been neutralized up to pH 4.5 and filtered is given in TABLE 3 below:

TABLE 3

| | | | | | Initial solution (mg/L) | | | | | | |
|---|---|---|---|---|---|---|---|---|---|---|---|
| Al | Ca | Co | Cr | CU | Fe | Mg | Mn | Na | Ni | Si | Zn |
| 444.14 | 529.96 | 49.60 | 1.46 | 90.00 | 14.44 | 6022.64 | 162.06 | 88.90 | 1676.22 | 44.88 | 20.72 |

Figure 4:
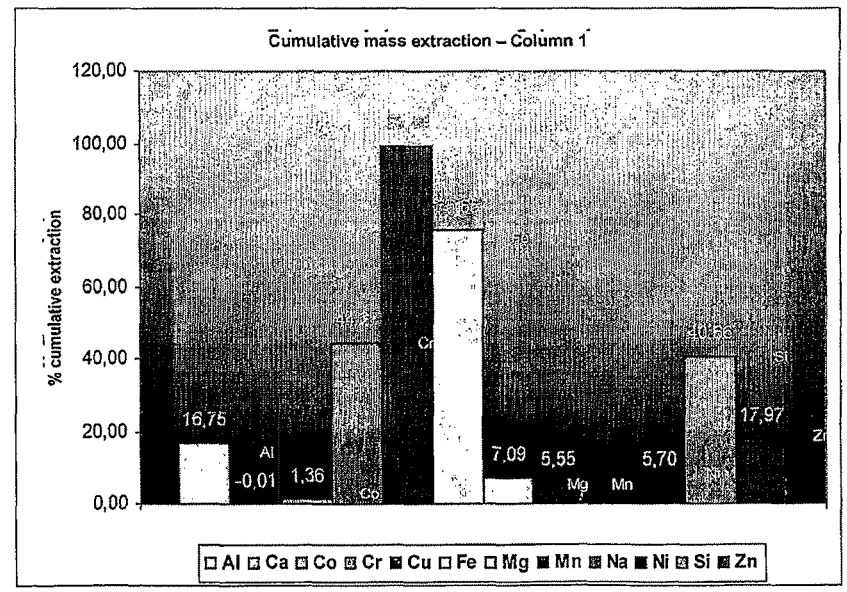
FIG. 4 is a figure illustrating the cumulative extraction of metals including copper removal during a first stage of the hybrid resin-in-solution process, according to various aspects of the current invention.
Figure 5:
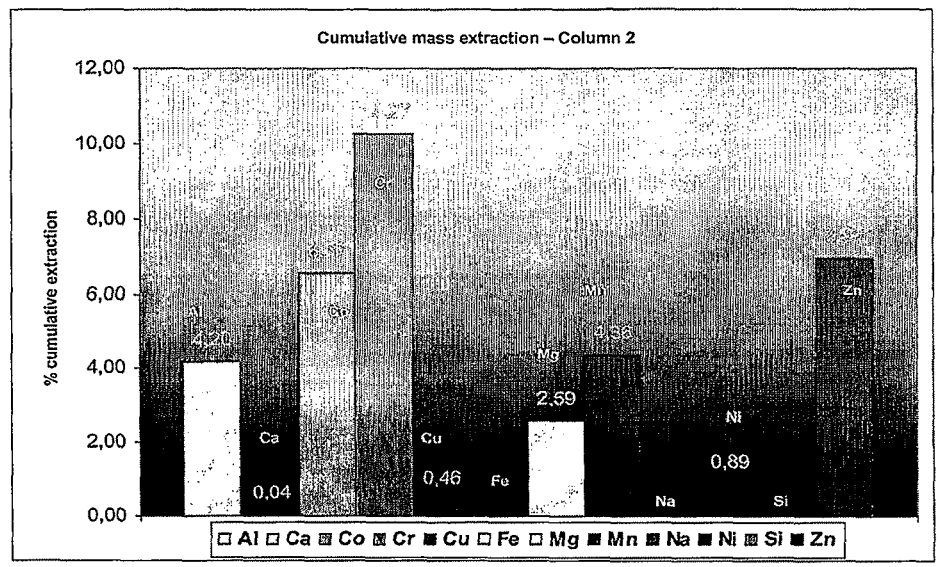
FIG. 5 is a figure illustrating the cumulative extraction of metals including copper removal during a first stage of the hybrid resin-in-solution process, according to various aspects of the current invention.

The first stage of the hybrid resin-in-solution process comprises two steps for the removal of copper, which are represented in FIG. 4 and FIG. 5.

Figure 6:
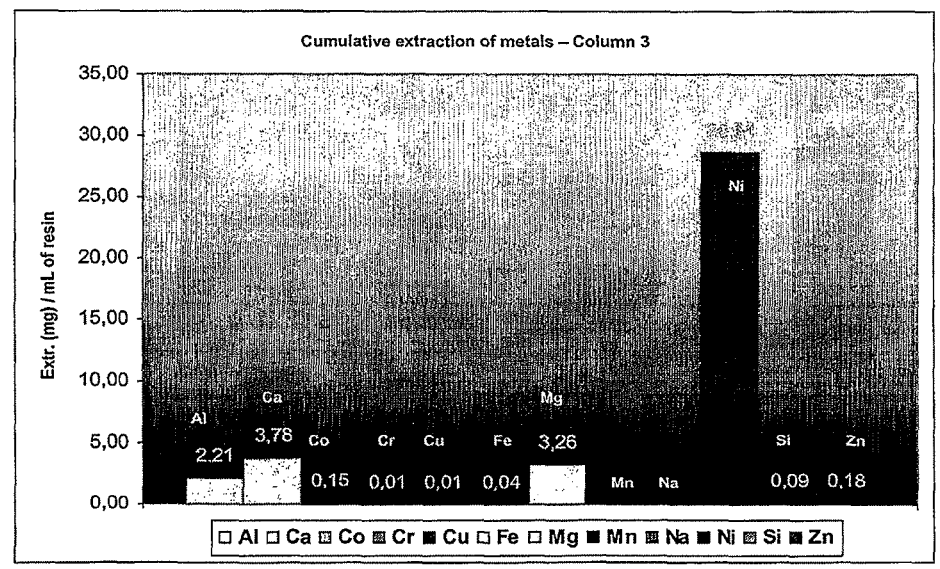
FIG. 6 is a figure illustrating the cumulative extraction of metals including nickel removal during a second stage of the hybrid resin-in-solution process, according to various aspects of the current invention.

The second stage of the hybrid resin-in-solution, for removal of nickel, may comprise various steps for selective purification. This stage is represented in FIG. 6.

Case 3: In the case of heap leaching, where an effluent in the liquid form is generated, said effluent may be treated in the form of resin-in-pulp, provided that the effluent solution, that has been neutralized but not subjected to subsequent solid-liquid separation, is regarded as pulp.

Case 4: In the case of an effluent in the form of pulp, said effluent may be neutralized and directed to the resin-in-pulp operation (5b) without the need for prior solid-liquid separation. In this case, the hybrid process in which the resin is in contact with the pulp is used.

Figure 7:
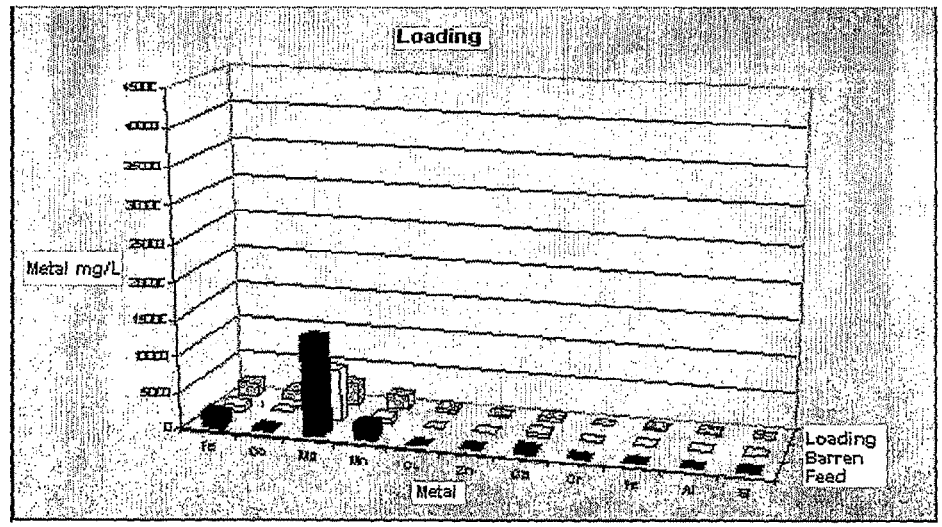
FIG. 7-9 are figures illustrating adsorption of metals in leach effluents, according to various aspects of the current invention.
Figure 8:
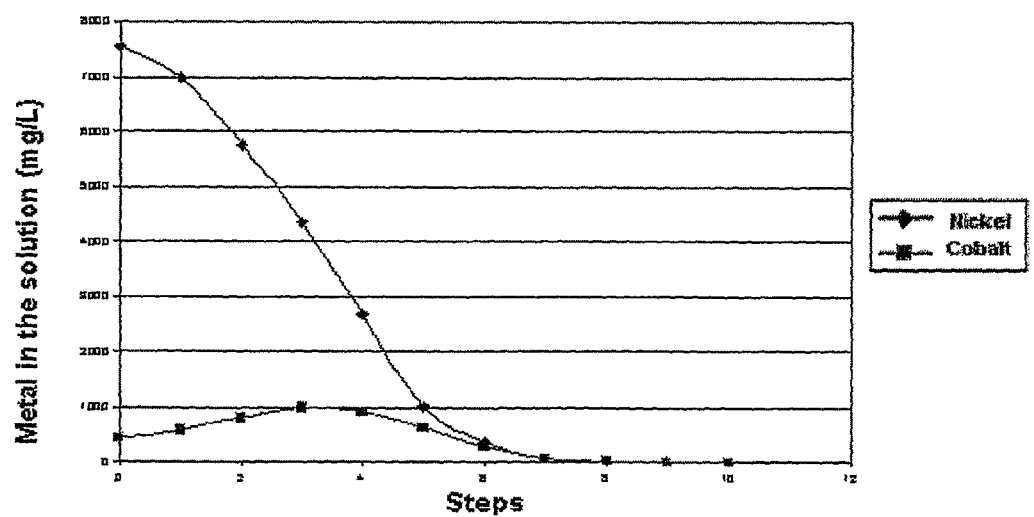
Figure 9:
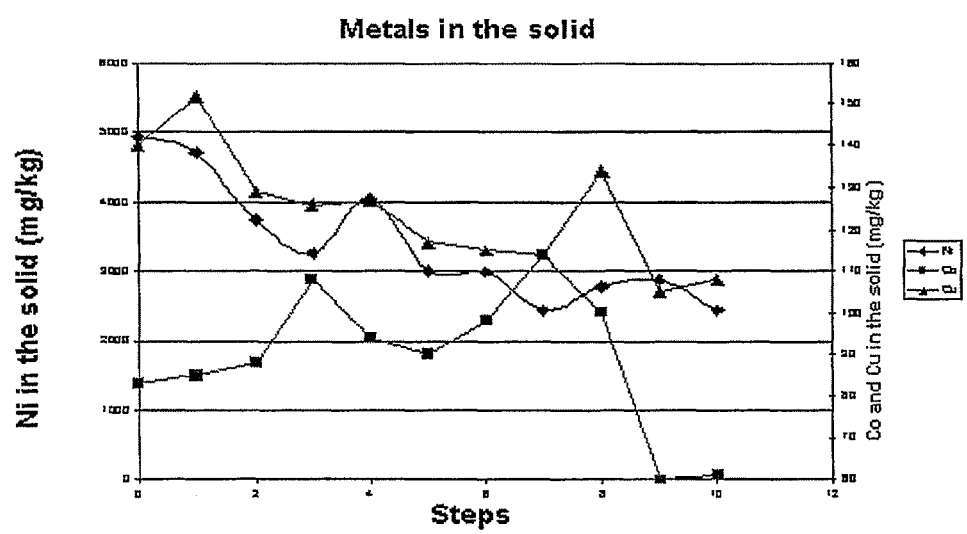
Figure 10:
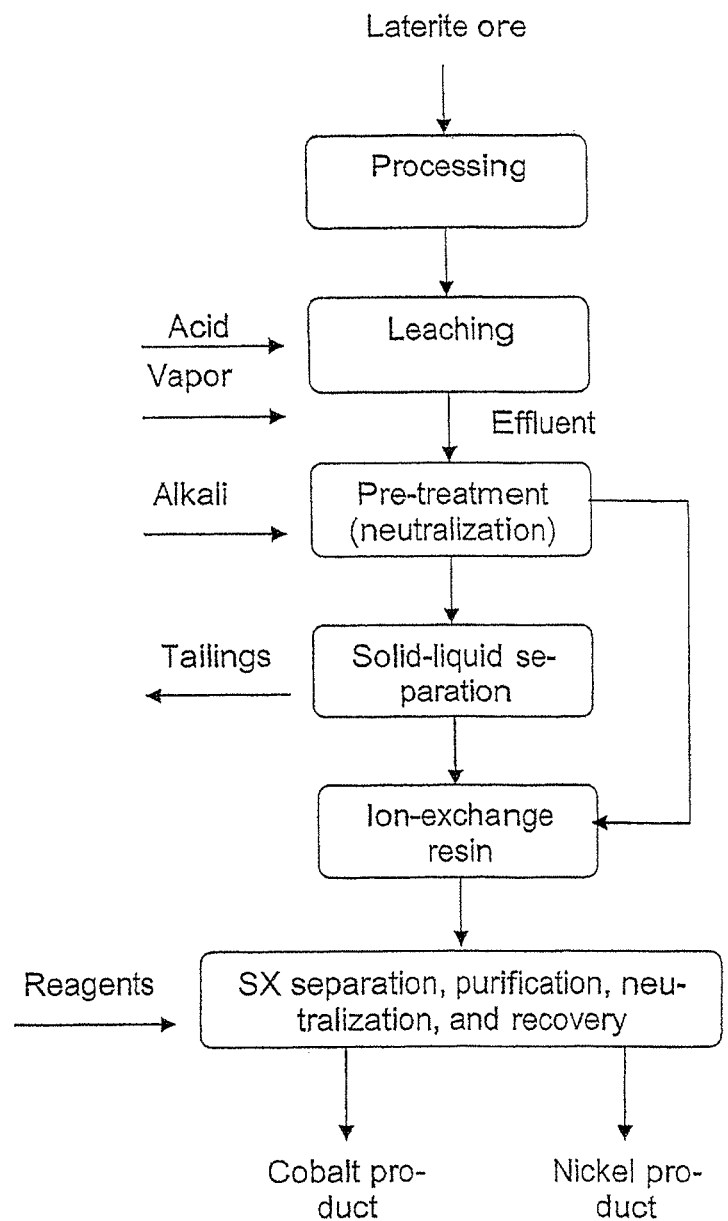
FIG. 10 is a diagram illustrating a conventional hydrometallurgical method of extracting nickel and cobalt.

FIGS. 7-9 illustrate the example of a leach effluent that has been neutralized up to pH=4 and brought in contact with the resin, using the hybrid resin-in-pulp process.

First stage of the hybrid resin-in-pulp process, for removal of such impurities as Fe, Mg, Mn, and Cu using selective resin:

The second stage of the hybrid resin-in-pulp process, for removal of nickel and cobalt, comprises ten steps for selective purification.

Afterwards, the loaded resin (Rc) from the ion-exchange stage (5) goes through an elution stage (6), and is immediately subjected to a separation, purification, and recovery stage (7), in which nickel and cobalt are recovered.

The invention claimed is:

1. A process for recovery of nickel and cobalt from laterite ores using ion exchange resin, comprising the following stages:
   (a) processing of the laterite ore by crushing, scrubbing, attrition, classification, and high-intensity magnetic separation;
   (b) leaching of a non-magnetic fraction from the previous stage (a);
   (c) optionally: neutralization of an effluent from at least one of the leaching and solid-liquid separation;
   (d) treatment of the effluents from stages (b) or optionally (c) in a hybrid ion-exchange resin system comprising at least one circuit for removal of impurities, and at least one circuit for recovery of the nickel and cobalt;
   (e) elution of the ion-exchange resin employed;
   (f) separation, purification, and recovery of the nickel and cobalt.

2. The process according to claim 1, wherein a magnetic fraction resulting from magnetic separation is discarded.

3. The process according to claim 1, wherein the leaching is carried out using either acid or basic leaching agents.

4. The process according to claim 3, wherein the leaching is at least one of sulfuric, hydrochloric, and nitric.

5. The process according to claim 4, wherein the leaching occurs with sulfuric acid.

6. The process according to claim 1, wherein the leaching occurs in tanks operating under either pressurized or atmospheric conditions, or a combination of both.

7. The process according to claim 1, where effluents in the form of pulp are used, said effluents are conveyed directly to the hybrid resin-in-pulp process for nickel recovery, without the need for prior neutralization.

8. The process according to claim 1, wherein the effluents in the form of solution are conveyed directly to a resin-in-solution process for nickel recovery without the need for prior neutralization.

9. The process according to claim 1, wherein the leaching occurs in atmospheric tanks and pressurized vessels and neutralization and solid-liquid separation are carried out, part of resulting precipitated solids are recycled, re-solubilized, and returned to the process, while the liquid phase is fed to the ion-exchange resin stage through a hybrid resin circuit.

10. The process according to claim 1, where leaching is in the form of heap leaching and only generates a liquid effluent without the presence of solids, said liquid effluent is neutralized, with subsequent formation of a pulp that is brought in contact with a resin in a resin-in-pulp process.

11. The process according to claim 1, wherein when an effluent pulp from atmospheric or pressure leaching requires neutralization so as to reduce the overload of impurities in the resin, the solid-liquid separation is unnecessary, and a hybrid resin-in-pulp process is used.

12. The process according to claim 1, wherein the neutralization is carried out in steps at different pH values.

13. The process according to claim 12, wherein a first neutralization step corresponds to pH<3, and a second neutralization step corresponds to pH>3.

14. The process according to claim 12, wherein a first neutralization step without losses of nickel generates a residue for discharge, while a second neutralization step generates losses of nickel, and for this reason, a solid phase is returned to a tank for re-solubilization and once the solid phase is re-solubilized, the re-solubilized solid phase is fed to the neutralization stage.

15. The process according to claim 1, wherein a solid phase from the solid-liquid separation can be re-solubilized and recirculated to the neutralization stage.

16. The process according to claim 1, wherein the effluent from the neutralization stage is in the form of pulp, and the effluent from the solid-liquid separation is in the form of solution.

17. The process according to claim 1, further comprising using resins having high performance under acidic conditions and low selectivity for impurities including at least one of copper, aluminum, and iron.

18. The process according to claim 1, further comprising using either resins in solution or resins in pulp, according to the type of feed to the treatment of the effluents.

19. The process according to claim 1, wherein a heap leaching effluent is in the form of solution being directed to neutralization, the ion-exchange is carried out during a resin-in-pulp stage, with pulp being understood as the neutralized effluent solution not subjected to subsequent solid-liquid separation.

20. The process according to claim 1, wherein an effluent in the form of pulp, from tank leaching, is neutralized and directed to a resin-in-pulp operation without the need for prior solid-liquid separation, in which case a hybrid process with the resin in contact with the pulp is used.

21. The process according to claim 1, wherein a leach effluent in the form of either pulp or solution, product of any type of leaching, is subjected to a treatment including a neutralization treatment, followed by solid-liquid separation, in which case a hybrid process with the resin in contact with the liquid phase is used.

22. The process according to claim 1, wherein a leach effluent in the form of either pulp or solution, resulting from atmospheric or pressure leaching, is conveyed directly to the hybrid ion-exchange process, without prior neutralization or solid-liquid separation.

23. The process according to claim 1, wherein reagents used in the elution are selected from the group consisting of sulfuric acid, hydrochloric acid, ammonium hydroxide, ammonium sulfate, and their mixtures.

24. The process according to claim 1, wherein after the elution stage, the resin is regenerated and reused.

25. The process according to claim 1, wherein the purification of either nickel or cobalt is accomplished through at least one of precipitation, hydrogen reduction, electrowinning, or solvent extraction.

* * * * *